United States Patent
Son et al.

(10) Patent No.: US 7,934,835 B2
(45) Date of Patent: May 3, 2011

(54) LASER DISPLAY DEVICE INCLUDING FIRST AND SECOND SCANNERS

(75) Inventors: Joong-kon Son, Yongin-si (KR); Seoung-jae Im, Yongin-si (KR); Ok-hyun Nam, Yongin-si (KR)

(73) Assignee: Samsung LED Co., Ltd., Gyeonggi-do (KR)

( * ) Notice: Subject to any disclaimer, the term of this patent is extended or adjusted under 35 U.S.C. 154(b) by 1022 days.

(21) Appl. No.: 11/798,562

(22) Filed: May 15, 2007

(65) Prior Publication Data

US 2007/0284530 A1 Dec. 13, 2007

(30) Foreign Application Priority Data

Jun. 8, 2006 (KR) ................. 10-2006-0051463

(51) Int. Cl.
*G03B 21/00* (2006.01)
(52) U.S. Cl. ................ 353/31; 353/48; 353/98; 353/99; 359/201.2; 359/204.2; 359/204.4
(58) Field of Classification Search .............. 353/31, 353/48, 98, 99; 359/201.1, 201.2, 204.1, 359/204.2, 204.4
See application file for complete search history.

(56) References Cited

U.S. PATENT DOCUMENTS

| | | | | |
|---|---|---|---|---|
| 3,652,956 A | * | 3/1972 | Pinnow et al. | 359/278 |
| 6,819,468 B2 | * | 11/2004 | Dho | 359/279 |
| 6,972,737 B2 | * | 12/2005 | Furukawa et al. | 345/32 |
| 2002/0054415 A1 | * | 5/2002 | Lee | 359/223 |
| 2002/0122260 A1 | * | 9/2002 | Okazaki et al. | 359/636 |
| 2005/0094110 A1 | * | 5/2005 | Nakamura | 353/85 |
| 2006/0060651 A1 | * | 3/2006 | McIntyre et al. | 235/454 |
| 2006/0264588 A1 | * | 11/2006 | Tokuda et al. | 526/209 |
| 2007/0031631 A1 | * | 2/2007 | Lundstrom et al. | 428/64.1 |
| 2007/0187616 A1 | * | 8/2007 | Burroughs et al. | 250/458.1 |

* cited by examiner

*Primary Examiner* — Georgia Y Epps
*Assistant Examiner* — Kevin Wyatt
(74) *Attorney, Agent, or Firm* — Harness, Dickey & Pierce, P.L.C.

(57) ABSTRACT

Provided is a laser display device. The laser display device may include at least one light source configured to emit at least one laser beam, at least one scanning unit configured to perform a scanning with the at least one laser beam, and an image forming unit configured to generate excitation light and scattering light by receiving the at least one laser beam from the scanning unit to form an image.

13 Claims, 5 Drawing Sheets

LASER DISPLAY DEVICE INCLUDING FIRST AND SECOND SCANNERS

PRIORITY STATEMENT

This application claims priority under 35 USC §119 to Korean Patent Application No. 2006-0051463, filed on Jun. 8, 2006, in the Korean Intellectual Property Office (KIPO), the entire contents of which are herein incorporated by reference.

BACKGROUND

1. Field

Example embodiments may relate to a laser display device, and more particularly, to a laser display device including an image forming unit configured to generate excitation light and scattering light from a blue laser beam.

2. Description of the Related Art

Display devices may be used to display an image by converting an electrical image signal into a visible image. An example of a conventional display device may be a cathode ray tube (CRT) used in a television set.

In a CRT display device, an electron beam may excite phosphor to generate excitation light. The CRT display device may display images by cathode luminescence by using an electron beam. However, the CRT uses a vacuum tube and a deflection yoke to deflect the electron beam, therefore, it is difficult to reduce the thickness and increase the screen size of CRT display devices. Furthermore, the brightness of the image(s) on CRT display devices is limited.

Projection type laser display devices using red, green, and blue laser beams have also been developed. Such projection type laser display devices may provide clearer images with a high contrast ratio, because a laser, which emits intense light, is used as a light source. However, the projection type laser display devices may have a speckle problem because of the high coherency of a laser beam. A speckle is an interference pattern (noise) produced by a laser beam reflected or scattered from a screen due to the roughness of the screen. This interference pattern is detected as a speckle by the retina of the eyes.

SUMMARY

Example embodiments may provide a laser display device utilizing excitation and scattering properties of a blue laser beam.

In an example embodiment, a laser display device may include at least one light source configured to emit at least one laser beam, at least one scanning unit configured to perform a scanning with the at least one laser beam, and an image forming unit configured to generate excitation light and scattering light by receiving the at least one laser beam from the scanning unit to form an image.

BRIEF DESCRIPTION OF THE DRAWINGS

Example embodiments may be more clearly understood from the following detailed description taken in conjunction with the accompanying drawings.

Figure 1:
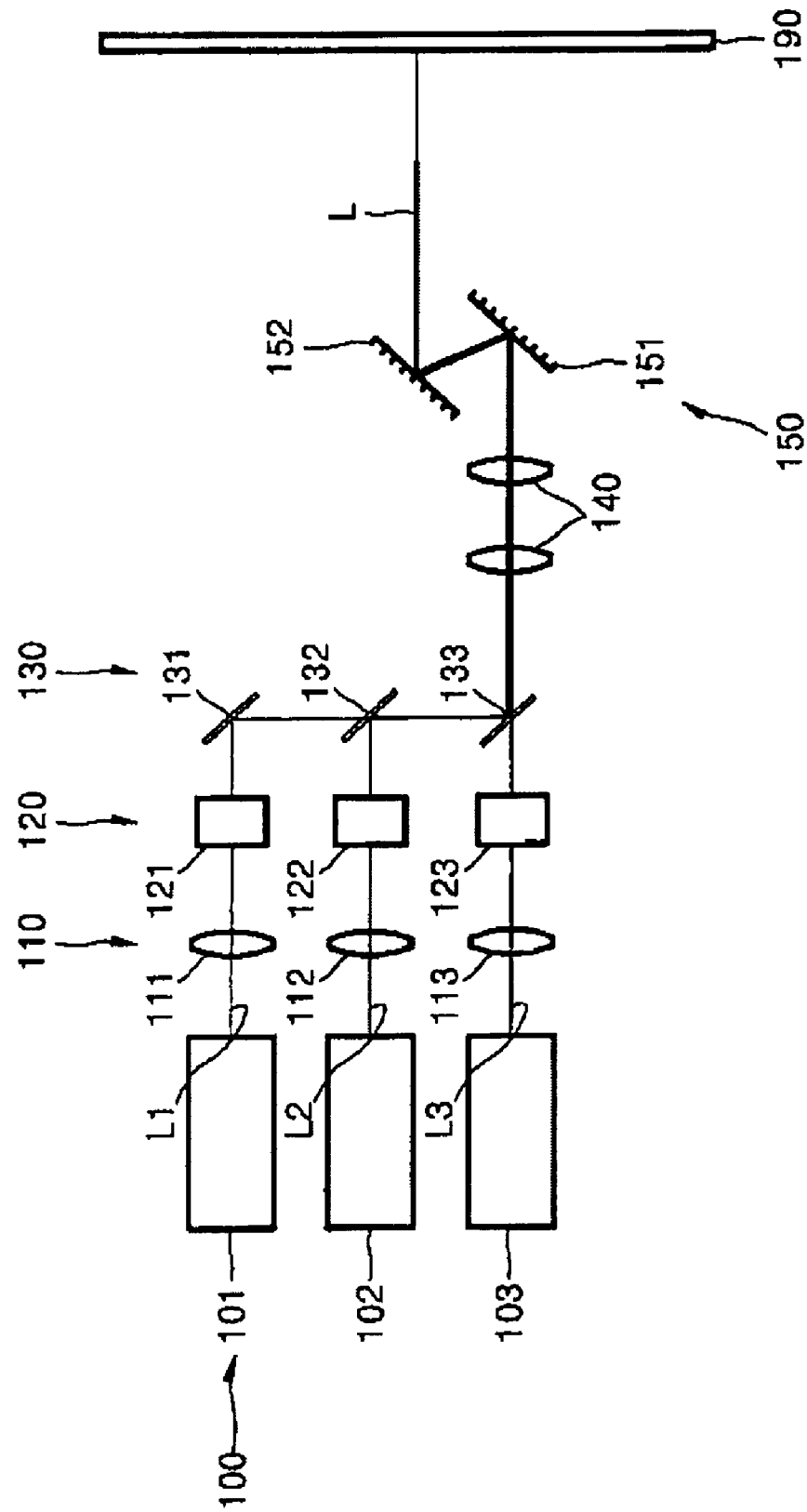
FIGS. 1-7 represent non-limiting, example embodiments as described herein.
Figure 2:
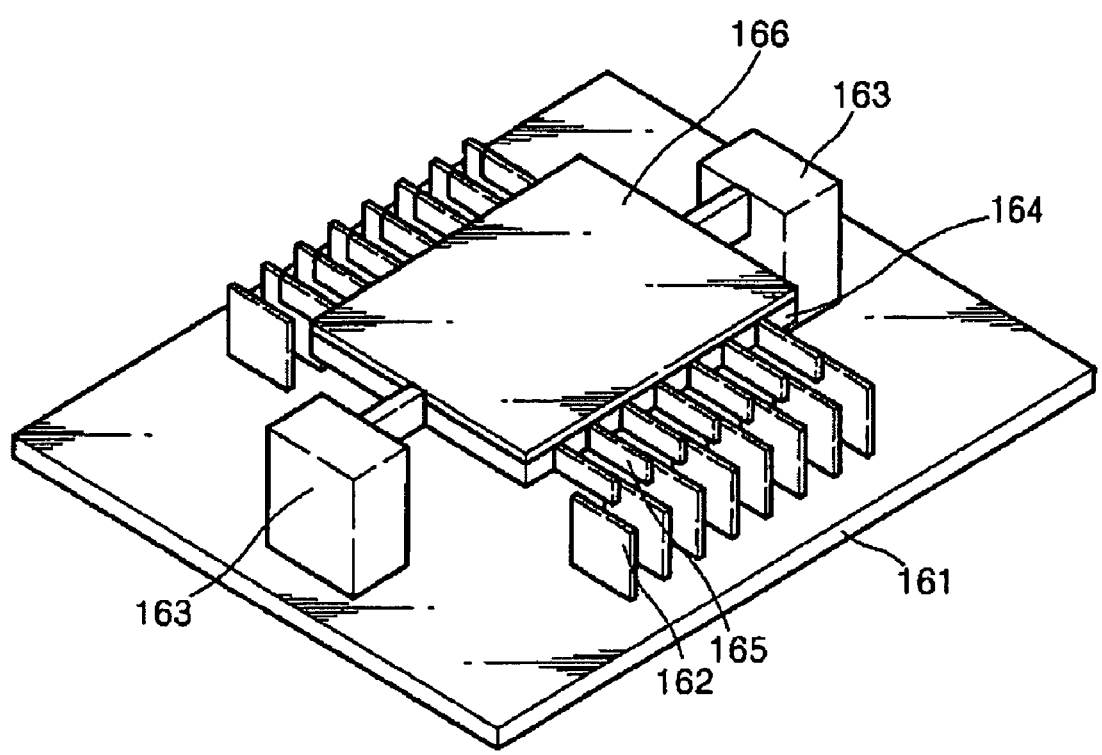
Figure 3:
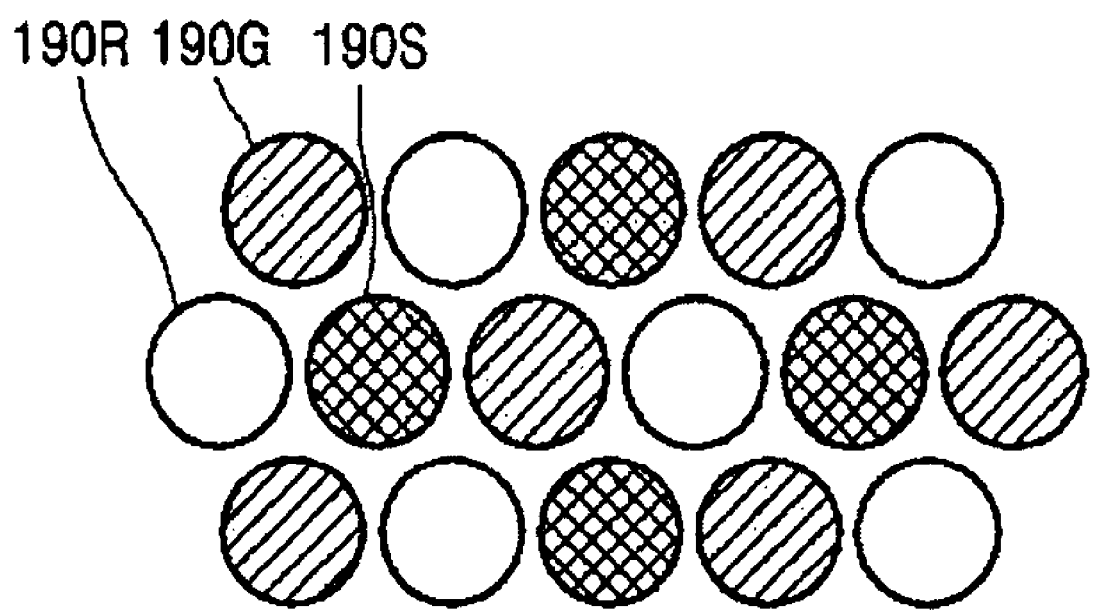
Figure 4:
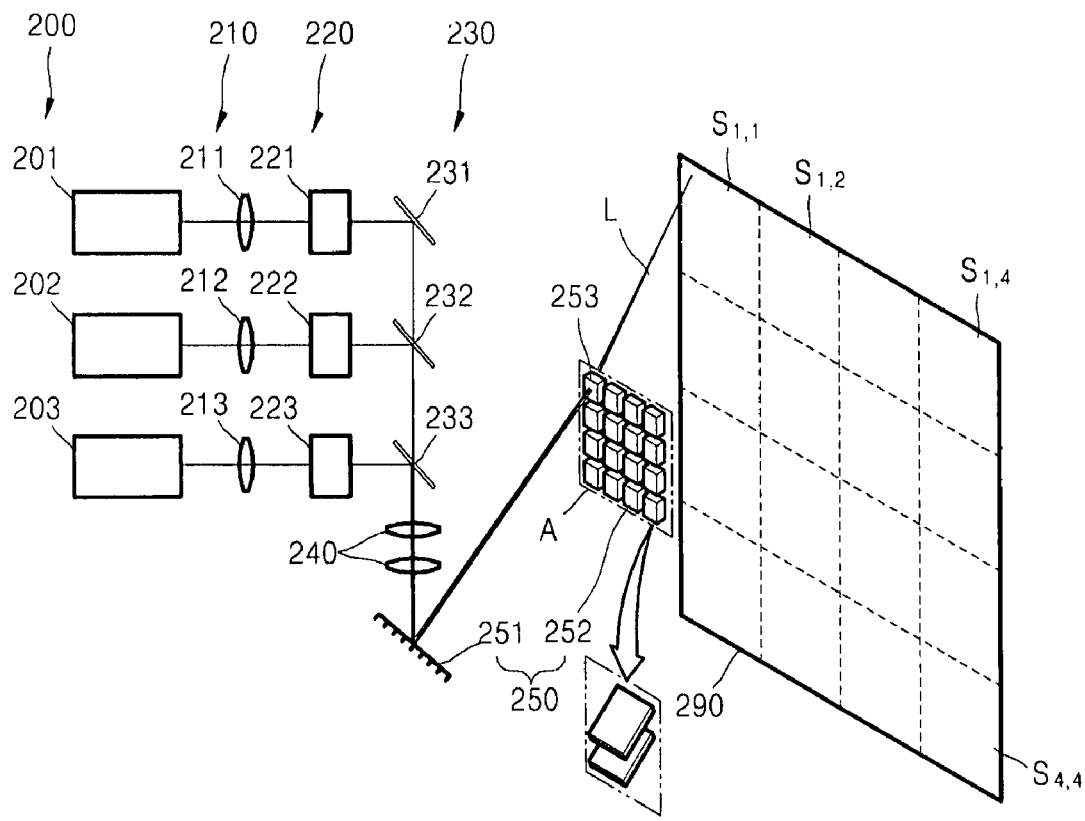
Figure 5:
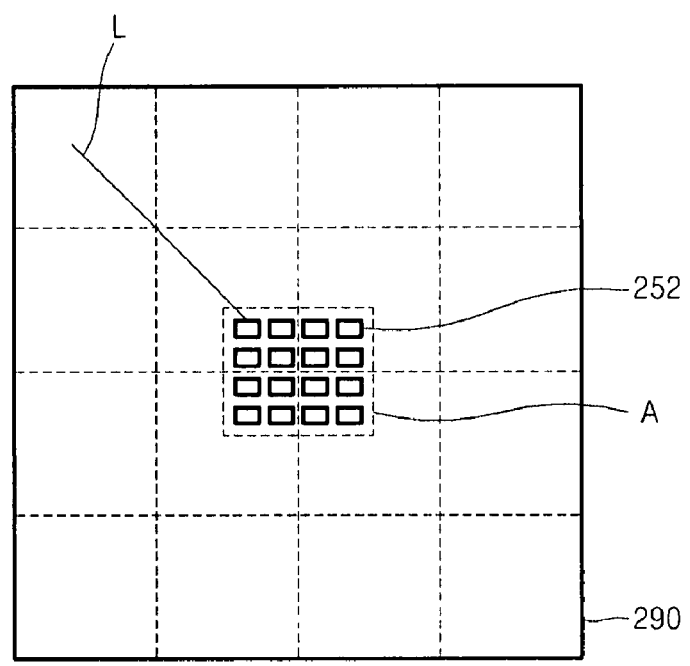
Figure 6:
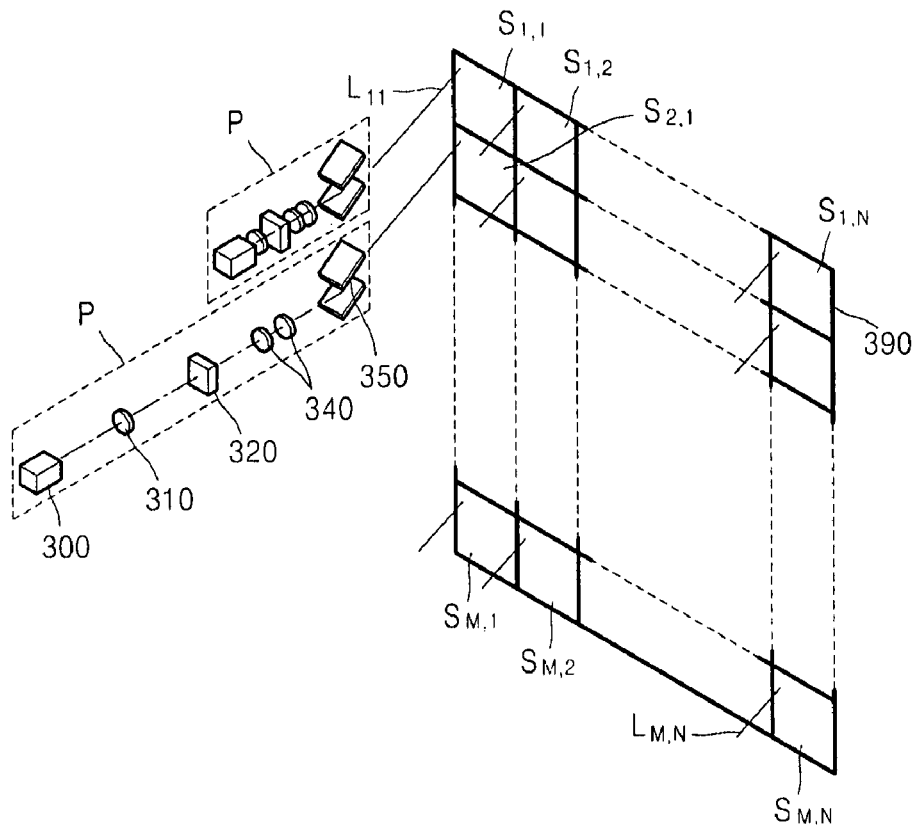
Figure 7:
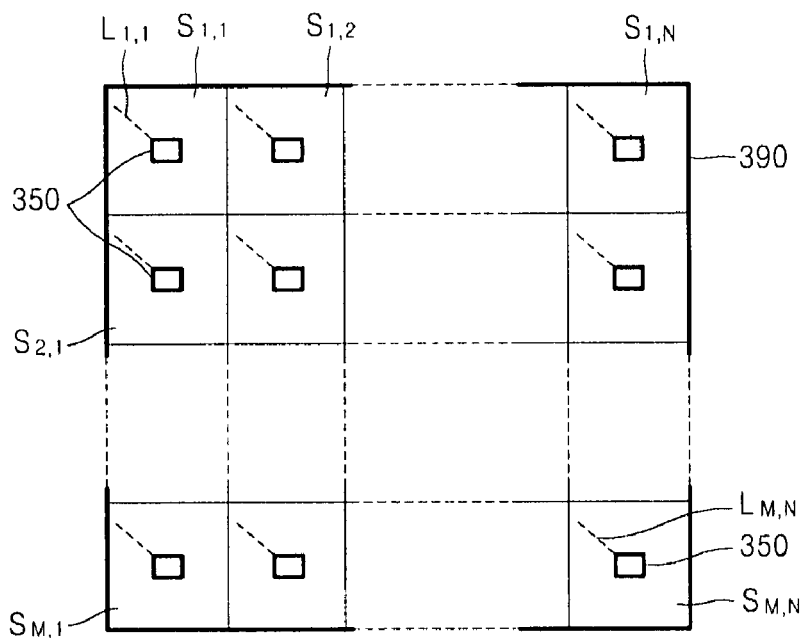

Example embodiments may become more apparent with reference to detail example embodiments thereof and the attached drawings in which:

FIG. 1 is a schematic diagram illustrating a laser display device according to an example embodiment;

FIG. 2 is a perspective view illustrating a scanning unit of the laser display device depicted in FIG. 1;

FIG. 3 illustrates phosphors and light scattering regions that form on an image forming unit of the laser display device depicted in FIG. 1;

FIG. 4 is a schematic diagram illustrating a laser display device according to another example embodiment;

FIG. 5 is a rear view of an image forming unit of the laser display device depicted in FIG. 4, in which only the image forming unit and a second scanner of the laser display device are shown;

FIG. 6 is a schematic diagram illustrating a laser display device according to another example embodiment; and FIG. 7 a rear view of an image forming unit of the laser display device depicted in FIG. 6, in which only the image forming unit and a second scanner of the laser display device are shown.

DETAILED DESCRIPTION OF EXAMPLE EMBODIMENTS

Reference will now be made in detail to example embodiments, examples of which are illustrated in the accompanying drawings. However, example embodiments are not limited to the embodiments illustrated hereinafter, and the embodiments herein are rather introduced to provide easy and complete understanding of the scope and spirit of example embodiments. In the drawings, the thicknesses of layers and regions are exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the-scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram illustrating a laser display device according to an example embodiment.

Referring to FIG. 1, the laser display device according to the example embodiment may include a light source 100 emitting laser beams L, a light modulating unit 120 modulating the laser beams L using an image signal, an optical path changing unit 130 changing an optical path in order to gather the modulated laser beams L together, a scanning unit 150 to scan with the laser beams L, and an image forming unit 190 on which an image is formed by the luminescent light and scattering light generated from the laser beams L.

The light source 100 may generate laser beams L having a wavelength of 400 to 450 nm. The laser beams L emitted from the light source 100 may be irradiated onto the image forming unit 190 to form an image by photoluminescence and light-scattering. In the example embodiment, the light source 100 may include a first blue laser diode 101, a second blue laser diode 102, and a third blue laser diode 103 that emit a first laser beam L1, a second laser beam L2, and a third laser beam L3, respectively, to form a color image.

The laser display device may further include a collimating optical unit 110 to collimate the laser beams L emitted from the light source 100. In detail, the collimating optical unit 110 may be disposed between the light source 100 and the light modulating unit 120. The collimating optical unit 110 may further include a first collimating lens 111, a second collimating lens 112, and a third collimating lens 113 to collimate the first to third laser beams L1, L2, and L3, respectively.

The laser display device may further include focusing lenses (not shown) disposed between the collimating optical unit 110 and the light modulating unit 120 in order to adjust the spot sizes of the first to third laser beams L1, L2, and L3 onto the light modulating unit 120.

The light modulating unit 120 may modulate the first to third laser beams L1, L2, and L3 according to an image signal from an image signal generating unit (not shown). The light modulating unit 120 may include a first light modulator 121, a second light modulator 122, and a third light modulator 123. The image signal of the image signal generating unit may be divided into a red image signal, a green image signal, and a blue image signal, and then the respective image signals may be transmitted to the first to third light modulators 121,122, and 123.

In FIG. 1, the light modulating unit 120 may modulate the laser beams L1, L2, and L3 emitted from the light source 100 using the image signal from the image signal generating unit. However, a current applied to the light source 100 may be modulated using the image signal so as to obtain modulated laser beams without using the light modulating unit 120. In other words, modulated laser beams may be directly obtained from the light source 100 by varying the current applied to the light source 100 according to the image signal from the image signal generating unit.

The optical path changing unit 130 may change optical paths of the first to third laser beams L1, L2, and L3, so that the first to third laser beams L1, L2, and L3 modulated by the first to third light modulators 121,122, and 123 may be bundled together and then directed to the scanning unit 150. The optical path changing unit 130 may include a reflection mirror 131, a first dichroic mirror 132, and a second dichroic mirror 133.

The reflection mirror 131 may reflect the first laser beam L1. The first dichroic mirror 132 may transmit the first laser beam L1 and reflect the second laser beam L2. The second dichroic mirror 133 may reflect the first and second laser beams L1 and L2 and transmit the third laser beam L3. After the reflection and transmission by the second dichroic mirror 133, the first to third laser beams L1, L2, and L3 may be directed to the scanning unit 150 in the form of a laser beam bundle (e.g., not mixed together) and simultaneously irradiated to the image forming unit 190.

The laser display device may further include a condensing optical unit 140 disposed between the optical path changing unit 130 and the scanning unit 150 in order to adjust the spot size of the laser beam bundle irradiated onto the image forming unit 190.

The scanning unit 150 may include a subsidiary scanner 151 and a main scanner 152. The subsidiary scanner 151 may scan the image forming unit 190 in a subsidiary scanning direction (a vertical direction of the image forming unit 190) using the laser beams L1, L2, and L3, and the main scanner 152 may scan the image forming unit 190 in a main scanning direction (a horizontal direction of the image forming unit 190) using the laser beams L1, L2, and L3. The arrangement order of the subsidiary scanner 151 and the main scanner 152 may be reversed.

The scanning unit 150 may include at least one micro scanner having a rotary mirror. A micro scanner, for example, a one-dimensional micro scanner is illustrated in FIG. 2.

FIG. 2 is a perspective view illustrating a one-dimensional micro scanner according to an example embodiment.

Referring to FIG. 2, the one-dimensional micro scanner may include a fixed comb electrodes 162 and a support 163 formed on a substrate 161, a stage 164 suspended by the support 163, and movable comb electrodes 165 formed on both sides of the stage 164. The fixed comb electrodes 162 and the movable comb electrodes 165 may be arranged so that ribs of the movable comb electrodes 165 may be disposed between ribs of the fixed comb electrodes 162. A mirror 166 may be formed on a top surface of the stage 164 to reflect laser beams. Due to the associated comb structure of the fixed comb electrodes 162 and the movable comb electrodes 165, the one-dimensional micro scanner may be operated by an electrostatic effect. A pair of one-dimensional micro scanners may be included in the laser display device as the subsidiary scanner 151 and the main scanner 152.

Alternatively, a two-dimensional micro scanner (not shown) may be used as the scanning unit 150 (refer to FIG. 1) to scan the image forming unit 190 both in the subsidiary and main scanning directions. For two-dimensional operation, the two-dimensional micro scanner may include a stage supported by a dual suspension structure and a dual comb electrode structure for two-dimensional actuation.

A pair of one-dimensional micro scanners or a two-dimensional micro scanner may scan the image forming unit 190 by slightly swinging the mirror 166, therefore, sweeping may be performed at a speed of 75 Hz or higher. Due to the high-speed sweeping, the laser display device according to the example embodiment may provide images at a higher contrast ratio than conventional CRT or LCD display devices.

FIG. 3 shows phosphors and light scattering regions of the image forming unit 190 depicted in FIG. 1.

Referring to FIG. 3, the image forming unit 190 may include red phosphors 190R emitting red light, green phosphors 190G emitting green light, and light scattering regions 190S, which may generate blue light by scattering a blue laser beam.

The image forming unit 190 may form an image by photoluminescence and light-scattering using a blue laser beam. When a particular substance is stimulated by light, the substance may emit excitation light. This phenomenon is known as photoluminescence, and examples of the photoluminescence may include fluorescence and phosphorescence. The term "luminescence" may denote a phenomenon in which a state of a substance changes into an excitation state by absorbing energy, for example, light, electricity, or radiation, and returns to a ground state by emitting the absorbed energy in the form of light. In order to emit light by photostimulation, light may be irradiated to a phosphor within a desired wavelength range so that the light may be absorbed by the phosphor. Then, the phosphor may emit excitation light having a wavelength equal to or greater than that of the irradiated light. Therefore, visible light (excitation light) may be obtained using a blue laser beam having a short wavelength.

The red and green phosphors 190R and 190G may respectively emit red and green excitation light by absorbing the first to third laser beams L1, L2, and L3. The light scattering regions 190S may transmit and scatter the first to third laser beams L1, L2, and L3 (blue laser beams), so that the light scattering regions 190S may appear to emit blue light.

The light scattering regions 190S and a method of forming the light scattering regions 190S are well-known to those of ordinary skill in the related art. Thus, detailed descriptions thereof will be omitted. The light scattering regions 190S may be formed using various materials as long as the light scattering regions 1 90S can transmit and scatter a blue laser beam. For example, the light scattering regions 190S may be formed by coating a PET or PS base film with a blue scattering material. Examples of the blue scattering material may include organic substances(e.g., polymethyl-methacrylate (PMMA), polyurethane (PU), polystyrene (PS), etc.), and inorganic substances (e.g., $SiO_2$, $CaCO_3$, $TiO_2$, and glass bead, and quantum dots, for example, CdS or CdSe quantum dots having a size suitable for blue emission, etc.). A blue laser beam may be transmitted through the base film and scattered by collision with the blue scattering material.

Each set of red phosphor 190R, green phosphor 190G, and the light scattering region 190S may make up each pixel of the image forming unit 190. The red and green excitation light may be used to present red and green images on the image forming unit 190, and the blue light formed by the light scattering regions 190S may be used to present a blue image on the image forming unit 190, so that a color image may be displayed on the image forming unit 190 by combining these images.

Since the blue laser beams L1, L2, and L3 proceed in a highly collimated state mostly without diffusion, each pixel of the image forming unit 190 may be formed so as to have a smaller size than that of a conventional LCD display device. Therefore, the laser display device of the example embodiments may provide images at a higher resolution than the conventional LCD display device. Furthermore, since the strengths of the red and green excitation light emitted from the image forming unit 190 may be proportional to the strengths of the laser beams L1, L2, and L3 irradiated to the image forming unit 190, a desired color may be obtained by adjusting the output powers of the first to third blue laser diodes 101, 102, and 103.

In the example embodiment illustrated in FIG. 1, the laser display device may include the three blue laser diodes 101, 102, and 103 to provide a color image. However, the laser display device of the example embodiment may not be limited to this configuration. For example, the laser display device may use only one blue laser diode to provide a monochrome image, or the laser display device may use four or more blue laser diodes to provide a natural color image.

FIG. 4 is a schematic diagram illustrating a laser display device according to another example embodiment, and FIG. 5 is a rear view of an image forming unit of the laser display device depicted in FIG. 4, in which only the image forming unit and a second scanner of the laser display device are shown. The example embodiment concerns a laser display device that provides a large screen by utilizing the structure shown in the example embodiment of FIG. 1.

Referring to FIGS. 4 and 5, the laser display device according to another example embodiment may include a light source 200, a light modulating unit 220, an optical path changing unit 230, a scanning unit 250, and an image forming unit 290. The laser display device may further include an optical unit 210 and/or may include an optical unit 240 disposed between the light source 200 and the light modulating unit 220 or between the optical path changing unit 230 and the scanning unit 250, so as to collimate or condense laser beams L emitted from the light source 200.

The light source 200 may include a first blue laser diode 201, a second blue laser diode 202, and a third blue laser diode 203 to form a color image.

The light modulating unit 220 may include a first light modulator 221, a second modulator 222, and a third modulator 223 that respectively modulate the three laser beams L emitted from the first to third blue laser diodes 201, 202, and 203 according to an image signal.

The optical path changing unit 230 may include a reflection mirror 231, a first dichroic mirror 232, and a second dichroic mirror 233 to gather the three laser beams L modulated by the light modulating unit 220 into a laser beam bundle and direct the laser beam bundle to the scanning unit 250.

In the example embodiment, similar elements as illustrated in FIG. 1 may be used. Therefore, description of those elements will be omitted. For example, the light source 100, the collimating unit 110, the light modulating unit 120, the optical path changing unit 130, etc. of FIG. 1 are similar to the light source 200, the collimating unit 210, the light modulating unit 220, the optical path changing unit 230, etc. of FIG. 4.

To realize a large screen, the image forming unit 290 may be divided into M×N regions $S_{1,1}$, $S_{1,2}$, through to $S_{M,N}$. The scanning unit 250 may include a first scanner 251 and a second scanner 252. The first scanner 251 may irradiate laser beams to the second scanner 252, and the second scanner 252 may include M x N sub scanners 253 corresponding to M×N regions $S_{1,1}$, $S_{1,2}$, through to $S_{M,N}$ of the image forming unit 290. In the example embodiment of FIG. 4, M and N may be four (4).

The same micro scanner as illustrated in FIG. 2 may be used is the first scanner 251 and the second scanner 252. In detail, the first scanner 251 may be configured with a pair of one-dimensional micro scanners, and each sub scanner 253 of the second scanner 252 may be configured with a pair of one-dimensional micro scanners. Alternatively, the first scanner 251 may be configured with a two-dimensional micro scanner, and each sub scanner 253 of the second scanner 252 may be configured with a two-dimensional micro scanner. In FIG. 4, the first scanner 252 may be configured with a two-dimensional micro scanner, and each sub scanner 253 of the second scanner 252 may be configured with a pair of one-dimensional micro scanners. However, the example embodiments are not limited to this configuration.

The second scanner 252 may be spaced a desired distance from a back surface of the image forming unit 290 and the sub scanners 253 may be arranged in an M×N matrix on an sub scanning plane (A). Laser beams L may be irradiated onto the back surface of the image forming unit 290. The distances between the second scanner 252 and regions $S_{1,1}$, $S_{1,2}$, through to $S_{M,N}$ of the image forming unit 290 may be different, and the sub scanners 253 may have different scanning areas. Therefore, regions $S_{1,1}$, $S_{1,2}$, through to $S_{M,N}$ of the image forming unit 290 may have different sizes. Furthermore, the sub scanners 253 of the second scanner 252 may be uniformly or non-uniformly arranged on the sub scanning plane (A).

The first scanner 251 may scan the second scanner 252 placed on the sub scanning plane (A) by irradiating the laser beams L gathered by the optical path changing unit 230 onto the second scanner 252 in a main scanning direction and in a subsidiary scanning direction, so that the laser beams L may be irradiated to each of the sub scanners 253.

The first scanner 251 may primarily scan the second scanner 252 using laser beams L and the second scanner 252 may secondarily scan the image forming unit 290 in main and subsidiary scanning directions using the laser beams L. For example, the first scanner 251 may primarily irradiate laser beams L to a sub scanner 253 of the second scanner 252 placed at a position (1,1) on the sub scanning plane (A) and simultaneously the sub scanner 253 may secondarily scan the image forming unit 290 by directing the received laser beams L in the main and subsidiary scanning directions.

Next, the first scanner 251 may primarily irradiate laser beams L to a sub scanner 253 of the second scanner 252 placed at a position (1,2) on the sub scanning plane (A) and simultaneously the sub scanner 253 may secondarily scan the image forming unit 290 by directing the received laser beams L in the main and subsidiary scanning directions. The primary scanning and secondary scanning may be sequentially repeated until the first scanner 251 primarily irradiates laser beams L to a sub scanner 253 of the second scanner 252 placed at a position (M, N) on the sub scanning plane (A) and simultaneously the sub scanner 253 secondarily scans the image forming unit 290 by directing the received laser beams L in the main and subsidiary scanning directions. In this way, formation of an entire image may be completed. This scanning operation may be repeatedly performed so that the image forming unit 290 may display images.

As explained above, the scanning operation may be performed in two steps by the first scanner 251 and the second scanner 252, so that the screen of the image forming unit 290 may be enlarged in proportion to the number of sub scanners 253 of the second scanner 252. Therefore, the example embodiment has an advantage in realizing an image on a large screen. Furthermore, due to the two-step scanning, the distance between the second scanner 252 and the image forming unit 290 may be reduced and thus the laser display device may have a slimer shape.

FIG. 6 is a schematic diagram illustrating a laser display device according to another example embodiment, and FIG. 7 is a rear view of an image forming unit of the laser display device depicted in FIG. 6, in which only the image forming unit and a second scanner of the laser display device are shown. The example embodiment concerns a laser display device that may provide an image on a large screen by utilizing the structure shown in the example embodiment of FIG. 1.

Referring to FIGS. 6 and 7, the laser display device according to the example embodiment may include an image forming unit 390 and M×N sub units (P). The image forming unit 390 may include M×N regions $S_{1,1}$, $S_{1,2}$, through to $S_{M,N}$. A sub unit (P) may be arranged at the back of the image forming unit 390 to irradiate a laser beam L to the corresponding regions $S_{1,1}$, $S_{1,2}$, through to $S_{M,N}$ of the image forming unit 390. In FIG. 6, only one of the sub units (P) is shown for clarity.

Each of the sub units (P) may include a sub light source 300, a sub collimating optical unit 310, a sub light modulating unit 320, a sub condensing optical unit 340, and a sub scanner 350. In the example embodiment, similar elements as illustrated in FIG. 1 may be used. Therefore, description of those elements will be omitted. For example, the light source 100, the collimating unit 110, the light modulating unit 120, the optical path changing unit 130, etc. of FIG. 1 are similar to the light source 300, the collimating unit 310, the light modulating unit 320, etc. of FIG. 6.

Although only one blue laser diode is shown in FIG. 6 as the sub light source 300, a plurality of blue laser diodes may be used for the light source 300 to form a color image. In this case, each of the sub units (P) may further include a sub optical path changing unit (not shown).

Referring again to FIGS. 6 and 7, the screen of the image forming unit 390 may be easily enlarged by increasing the number of the sub units (P).

In the example embodiment, M×N sub scanners 350 may be arranged at the back of the image forming unit 390 in correspondence with the regions $S_{1,1}$, $S_{1,2}$, through to $S_{M,N}$. Each of the M×N sub scanners 350 may irradiate a laser beam L that is individually modulated.

In order to form an image on the image forming unit 390, regions $S_{1,1}$, $S_{1,2}$, through to $S_{M,N}$ may be sequentially or simultaneously scanned. For example, each of the sub units (P) may sequentially receive an image signal from an image signal generating unit (not shown) so as to modulate a laser beam L and irradiate the modulated laser beam L to the image forming unit 390 in order to form an image on the image forming unit 390. When the laser display device is used in a television, an image may be formed by the sequential scanning method. However, a signal for an entire image may be divided into sub signals corresponding to regions $S_{1,1}$, $S_{1,2}$, through to $S_{M,N}$, and all regions $S_{1,1}$, $S_{1,2}$, through to $S_{M,N}$ may be simultaneously scanned using the sub signals.

As described above, in the laser display device of the example embodiment, the light source may use a blue laser diode so that the efficiency of the red phosphors may be increased.

Furthermore, the laser display device may use blue laser beams to form an image by using the photoluminescence of the red and green phosphors and the scattering light of the light scattering regions. Therefore, the laser display device may provide an image with high brightness and contrast ratio.

The foregoing is illustrative of example embodiments and is not to be construed as limiting thereof. Although example embodiments have been described, those skilled in the art will readily appreciate that many modifications are possible in example embodiments without materially departing from the novel teachings and advantages of example embodiments. Accordingly, all such modifications are intended to be included within the scope of the claims. In the claims, means-plus-function clauses are intended to cover the structures described herein as performing the recited function, and not only structural equivalents but also equivalent structures. Therefore, it is to be understood that the foregoing is illustrative of example embodiments and is not to be construed as limited to the specific embodiments disclosed, and that modifications to the disclosed embodiments, as well as other embodiments, are intended to be included within the scope of the invention.

What is claimed is:

1. A laser display device, comprising:
   at least one light source configured to emit at least one laser beam;
   at least one scanning unit configured to perform a scanning with the at least one laser beam; and
   an image forming unit configured to generate excitation light and scattering light by receiving the at least one laser beam from the at least one scanning unit to form an image;
   wherein the image forming unit comprises a plurality of pixels including a phosphor for generating the excitation light and a light scattering region for generating the scattered light,
   wherein the at least one scanning unit includes a first scanner and a second scanner configured to perform a first and secondary scanning, respectively,
   wherein the second scanner includes a plurality of sub-scanners, the plurality of sub-scanners being arranged on a sub-scanning plane,
   wherein the image forming unit includes a plurality of regions corresponding to the plurality of sub-scanners of the second scanner,
   wherein the first scanner scans the at least one laser beam on the sub-scanning plane, and
   wherein each of the plurality of sub-scanners scans the at least one laser beam on the image forming unit.

2. The laser display device of claim 1, further comprising:
   a light modulating unit configured to modulate the at least one laser beam emitted from the at least one light source according to an image signal.

3. The laser display device of claim 2, further comprising:
   a collimating optical unit configured between the at least one light source and the light modulating unit.

4. The laser display device of claim 2, further comprising:
   an image generating unit configured to generate the image signal; and
   a condensing optical unit configured to condense the at least one modulated laser beam and focus the at least one modulated laser beam onto the image forming unit.

5. The laser display device of claim 1, wherein the at least one light source is configured to modulate and emit the at least one laser beam according to an image signal.

6. The laser display device of claim 1, wherein the at least one light source is a blue laser diode.

7. The laser display device of claim 1, wherein the phosphor comprises a red phosphor and a green phosphor.

8. The laser display device of claim 1, wherein the at least one light source is configured to emit a plurality of laser beams, and
   wherein the plurality of laser beams includes a first blue laser beam, a second blue laser beam, and a third blue laser beam.

9. The laser display device of claim 8, further comprising:
   an optical path changing unit configured to:
      change optical paths of at least one of the first, second, and third blue laser beams;
      bundle the first, second, and third blue laser beams; and
      irradiate the bundled blue laser beams to the image forming unit.

10. The laser display device of claim 9, wherein the optical path changing unit comprises:
    a first reflection mirror configured to reflect the first blue laser beam;
    a first dichroic mirror configured to transmit the first blue laser beam and reflect the second blue laser beam; and
    a second dichroic mirror configured to reflect the first and second blue laser beams and transmit the third blue laser beam.

11. The laser display device of claim 1, wherein the first scanner includes at least one one-dimensional scanner, and
    wherein each of the plurality of sub-scanners includes at least one one-dimensional scanner.

12. The laser display device of claim 1, wherein the first scanner includes at least one two-dimensional scanner,
    wherein each of the plurality of sub-scanners includes at least one two-dimensional scanner,
    wherein the plurality of sub-scanners is arranged in an MxN matrix on the sub-scanning plane,
    wherein the first scanner primarily scans the at least one laser beam on the sub-scanning plane in a main scanning direction and in a subsidiary scanning direction, and
    wherein each of the plurality of sub-scanners secondarily scans the at least one laser beam on the image forming unit in the main and subsidiary scanning directions.

13. The laser display device of claim 1, wherein the first scanner includes a pair of one-dimensional scanners, a two-dimensional scanner, or a combination thereof, and
    wherein each of the plurality of sub-scanners includes a pair of one-dimensional scanners, a two-dimensional scanner, or a combination thereof.

* * * * *